United States Patent [19]

Arkles

[11] Patent Number: 4,550,139

[45] Date of Patent: Oct. 29, 1985

[54] MIXTURES OF POLYACRYLATE RESINS AND SILOXANE-STYRENE COPOLYMERS

[75] Inventor: Barry C. Arkles, Ambler, Pa.

[73] Assignee: Petrarch Systems, Inc., Bristol, Pa.

[21] Appl. No.: 457,558

[22] Filed: Jan. 13, 1983

Related U.S. Application Data

[63] Continuation-in-part of Ser. No. 360,525, Mar. 22, 1982, Pat. No. 4,478,981.

[51] Int. Cl.$^4$ .................... C08L 33/08; C08L 33/10; C08L 53/00
[52] U.S. Cl. ........................................ 525/90; 525/63; 525/100; 525/209; 523/107
[58] Field of Search .................. 525/90, 100, 209, 63, 525/69, 72; 523/107

[56] References Cited

U.S. PATENT DOCUMENTS

| | | | |
|---|---|---|---|
| 3,665,052 | 5/1972 | Saam et al. | 525/106 |
| 3,686,355 | 8/1972 | Gaines et al. | 525/90 |
| 3,691,257 | 9/1972 | Kendrick et al. | 525/90 |
| 3,787,238 | 1/1974 | Juliane | 525/90 |
| 3,808,178 | 4/1974 | Gaylord | 526/79 |
| 4,120,570 | 10/1978 | Gaylord | 351/249 |
| 4,139,513 | 2/1979 | Tanaka et al. | 523/107 |
| 4,139,692 | 2/1979 | Tanaka et al. | 204/159.23 |
| 4,152,508 | 5/1979 | Ellis et al. | 526/279 |
| 4,153,641 | 5/1979 | Deichert et al. | 526/264 |

OTHER PUBLICATIONS

Mandel, Robert B., "Corneal Physiology and Permeable Materials", Contact Lense Manufacturers Association, (1981).

Refojo, Miguel F., "Current Status of Biomaterials in Ophthalmology", *Survey of Ophthalmology*, vol. 26, No. 5, pp. 257–265 (Mar., Apr., 1982).

Arkles, Barry C., "New–Generation Silicones for Medical Devices", *Medical Device & Diagnostic Industry*, vol. 3, No. 4, Apr. 1981, Canon Communications, Inc.

"POLYCON" Lense Advertisement.

*Primary Examiner*—Wilbert J. Briggs, Sr.
*Attorney, Agent, or Firm*—Panitch Schwarze Jacobs & Nadel

[57] ABSTRACT

Optically clear lenses, particularly contact lenses, may be prepared from an alloy of a polyacrylate resin and a siloxane-styrene copolymer, the alloy having an oxygen permeability greater than the polyacrylate resin. Preferably the polyacrylate is polymethylmethacrylate or methylacrylate-ethylacrylate copolymer, and the siloxane-styrene copolymer is preferably a polydimethylsiloxane-alpha-methylstyrene block copolymer. The alloy composition may be produced by melt mixing, preferably by polymerizing acrylate monomers in the presence of siloxane-styrene copolymer.

14 Claims, No Drawings

MIXTURES OF POLYACRYLATE RESINS AND SILOXANE-STYRENE COPOLYMERS

CROSS REFERENCE TO RELATED APPLICATION

This application is a continuation-in-part of my copending U.S. patent application Ser. No. 360,525, filed Mar. 22, 1982 now U.S. Pat. No. 4,478,981, for "Mixtures of Polyacrylate Resins and Siloxane Carbonate Copolymers.

BACKGROUND OF THE INVENTION

This invention relates to mixtures (alloys) of polyacrylate resins and siloxane-styrene copolymers for use in fabricating contact lenses. More particularly, this invention concerns mixtures of polymethylmethacrylate (PMMA) and polydimethylsiloxane-α-methylstyrene block copolymers.

Polymethylmethacrylate and similar polyacrylate resins are frequently utilized to fabricate contact lenses since they offer a combination of exemplary properties including clarity, flexibility, dimensional stability and durability. The oxygen permeability of contact lenses fabricated from these materials, however, often results in corneal edema since ocular tissue satisfies some of its oxygen requirements by direct atmosphereic contact. Consequentially, a significant portion of the population cannot comfortably wear lenses of the polyacrylate class. In all cases, extended wear of such polyacrylate lenses is not recommended.

Although the enhanced permeability of most soft lens systems now on the market may compensate for this deficiency, the preciseness of optics, including the ability to correct for astigmatism, is sacrificed. Also, the dimensional stability of the so-called hydrogels is poor. An excellent paper dealing with oxygen permeability of contact lenses is "Corneal Physiology And Permeable Materials" by Robert B. Mandell which was delivered in New Orleans, La. on Oct. 22, 1981, published by Contact Lens Manufacturers Association. A more recent review of these materials is provided by Refojo, F., "Current Status of Biomaterials in Ophthalmology," *Survey of Ophthalmology* 26:5, pgs. 257–265 (March-April 1982).

The incorporation of various siloxane containing methacrylate monomers into copolymers has been shown to increase the oxygen permeability of polyacrylate resins. U.S. Pat. Nos. 3,808,178; 4,139,513; 4,139,692; 4,152,508 and 4,153,641 are indicative of this approach. The use of methacrylate silicones for contact lenses is described in "New-Generation Silicones For Medical Devices" by Barry C. Arkles (the applicant herein), *Medical Device and Diagnostic Industry*, Volume 3, No. 4, April 1981, Canon Communications, Inc.

SUMMARY OF THE INVENTION

There has now been discovered a new composition comprising a mixture or alloy of a polyacrylic resin and siloxane-styrene copolymers. This composition is particularly useful in fabricating contact lenses since it enhances the oxygen permeability of polyacrylic resins. A particularly preferred mixture is polymethylmethacrylate or methylmethacrylate-ethylacrylate copolymers and polydimethylsiloxane-α-methylstyrene block copolymer.

The mixtures of this invention possess excellent optical, mechanical and oxygen transmission properties. These mixtures behave homogeneously during melt processing and microblock phase separation is not observed.

DETAILED DESCRIPTION OF PREFERRED EMBODIMENTS

The siloxane-styrene copolymers of this invention may be illustrated by the following structure for polydimethylsiloxane-α-methylstyrene copolymer:

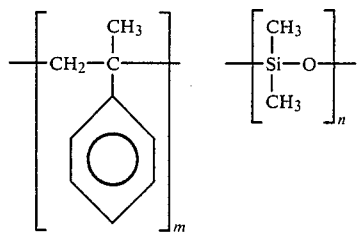

where m and n indicate the numbers of repeating units of styrene and siloxane moieties, respectively.

Although random copolymers can be used, block copolymers are generally preferred. Copolymers can have the following configurations, wherein X and Y represent two different polymerizable moieties.

random copolymer
XXYYYXYXYYYXXXXY
block copolymer
XXX—YYY—XXX—YYY;   XX—XXY—YYXX-—XXYY—YY
alternating copolymer
XYXYXYXYXYXY
graft copolymer

| XXXXXXXXXXX | | |
|---|---|---|
| Y | Y | Y |
| Y | Y | Y |
| Y | Y | Y |
| Y | Y | Y |

Block copolymers are composed of (not necessarily equal) alternations of runs of each of the two monomers forming the copolymer. Whereas random copolymers exhibit properties which are generally intermediate those of the monomers, block copolymers tend to exhibit the properties of each of the monomers.

A key element of this invention is the judicious selection and synthesis of block copolymers with the following essential characteristics. The refractive index of the block copolymer must match closely that of the polyacrylate base resin or else the alloy is often transluscent rather than clear. The melt rheology must also be relatively close to that of the polyacrylate base resin. The block sizes of the copolymer must be relatively small to eliminate macro-domain formation. The block copolymer must have a high permeability to oxygen. The permeabilities of the styrene-siloxane copolymers of this invention range from 250 to $400 \times 10^{10}$ cm$^3$(STP)cm/cm$^2$s(cm Hg), while the polyacrylates range from 0.5 to $1.5 \times 10^{10}$.

The transition from the siloxane portion to the styrene portion of the silicone polystyrene copolymer may be directly through a backbone carbon to the silicon. It may also be from a backbone carbon to an oxygen bound to silicon. Alternatively, the siloxane can be grafted onto the benzene ring of the styrene. These materials are described by Noshay & McGrath in *Block Copolymers,* Wiley Publishers, 1978. The preferred block copolymers used in this invention are described in U.S. Pat. No. 3,665,052 of Saam and Fearon.

Polymethylmethacrylate is one example of a polyacrylate that can be utilized in this invention. While it is preferred to use a linear, optical grade of thermoplastic polymethylmethacrylate, copolymers and cross-linked grades may also be employed. Typical comonomers include ethylacrylate, methacrylic acid, acrylic acid, ethylmethacrylate, cyclohexylmethacrylate, dimethyl itaconate and tris(trimethylsiloxy)propylmethacrylate. Primary reasons for using non-homopolymer materials include altering refractive index, increasing wettability and improving dimensional stability.

The siloxane-styrene copolymer component of the mixture or alloy of this invention makes up from between about 0.5 and about 65 weight percent, and preferably between about 2 and about 40 weight percent of the total mixture.

The invention is further described by reference to the following specific, non-limiting examples.

EXAMPLE 1

A methylmethacrylate-ethylacrylate copolymer, namely, Plexiglass V811 by Rohm and Haas, was combined with 5 weight percent polydimethylsiloxane 60%-α-methylstyrene 36%-p-butylstyrene 4% block copolymer (i.e., the copolymer contained 60 weight percent polydimethylsiloxane). The molecular weight of the copolymer was in the range of about 75,000 to 120,000. The DP (degree of polymerization) of the dimethylsiloxane unit was greater than 4 (i.e., n is greater than 4 in the above formula). The materials were predried and then melt-mixed in a twin-screw vented extruder at cylinder temperatures of 425°-460° F. The extrudate was air cooled and chopped to $\frac{1}{8}''$ pellets. The pelletized resultant mixture was tumbled and then molded. The mixture demonstrated the following properties:

| | |
|---|---|
| Water Absorption, 24 hours | 0.75% |
| Flexural Strength | 10,800 psi |
| Flexural Modulus | 370,000 psi |
| Izod Impact Strength | |
| notched | 0.3 ft-lbs-in |
| unnotched | 1.7 ft-lbs-in |
| Refractive Index | 1.49 |

Contact lenses were molded from the above polymer mixture. The equivalent oxygen percentage (EOP) was determined to be as followed:

| 0.15 mm lens | 2.0% |
|---|---|

(The EOP of air is 21%)

EXAMPLE 2

A second extrusion was prepared under the conditions of Example 1 except that the concentration of the siloxane-styrene copolymer in the mixture was 30 weight percent. In order to improve clarity the system was tumbled after the extrusion and re-extruded. Moldings had tensile strengths of 8000 psi. A 0.1 mm lens had an EOP of 7-9%.

EXAMPLE 3

A random copolymer of ethylmethacrylate 10% methylmethacrylate 90% was blended with a block copolymer consisting of polydimethylsiloxane 75%-α-methylstyrene 22%-styrene 3% in a 19:1 ratio as in Example 1. The EOP of a 0.15 mm lens was 2.5%.

The present invention may be embodied in other specific forms without departing from the spirit or essential attributes thereof and, accordingly, reference should be made to the appended claims, rather than to the foregoing specification, as indicating the scope of the invention.

I claim:

1. An optically clear lens prepared from a compositions comprising an alloy of a polyacrylate resin and a siloxane-styrene copolymer, said alloy having an oxygen permeability greater than the polyacrylate resin.

2. A lens according to claim 1 wherein said siloxane-styrene copolymer is a block copolymer.

3. A lens according to claim 1 wherein said siloxane-styrene copolymer is polydimethylsiloxane-α-methylstyrene.

4. A lens according to claim 3 wherein said polydimethylsiloxane comprises about 60 weight percent of the copolymer.

5. A lens according to claim 1 wherein said polyacrylate resin is methylmethacrylate-ethylacrylate copolymer.

6. A lens according to claim 1 wherein said copolymer comprises between about 0.5 and about 65 weight percent of said alloy.

7. A lens according to claim 1 wherein said copolymer comprises between about 2 and about 40 weight percent of said alloy.

8. A lens according to claim 1 wherein said copolymer is polydimethylsiloxane-α-methylstyrene-p-t-butylstyrene.

9. A lens according to claim 1 wherein said copolymer is polydimethylsiloxane-α-methylstyrene-styrene.

10. A lens according to claim 1 which is a contact lens.

11. A lens according to claim 1 wherein said composition is produced by melt mixing.

12. A lens according to claim 1 wherein said composition is produced by polymerizing acrylate monomers in the presence of siloxane-styrene copolymer.

13. A lens according to claim 11 wherein said lens is a contact lens.

14. A lens according to claim 12 wherein said lens is a contact lens.

* * * * *